United States Patent [19]
van Ooij et al.

[11] Patent Number: 5,292,549
[45] Date of Patent: Mar. 8, 1994

[54] METALLIC COATED STEEL HAVING A SILOXANE FILM PROVIDING TEMPORARY CORROSION PROTECTION AND METHOD THEREFOR

[75] Inventors: Wim J. van Ooij; Ricole A. Edwards, both of Fairfield; Ashok Sabata, Middletown, all of Ohio

[73] Assignee: Armco Inc., Middletown, Ohio

[21] Appl. No.: 965,313

[22] Filed: Oct. 23, 1992

[51] Int. Cl.$^5$ .............................................. B05D 5/00
[52] U.S. Cl. ..................................... 427/156; 427/387; 427/388.2
[58] Field of Search ................ 427/156, 388.2, 387; 528/35, 38

[56] References Cited

U.S. PATENT DOCUMENTS

| | | | |
|---|---|---|---|
| 3,085,908 | 4/1963 | Morehouse et al. | 427/388.2 |
| 3,175,921 | 3/1965 | Hedlund | 427/388.2 |
| 4,411,964 | 10/1983 | Hara et al. | 428/626 |
| 4,689,085 | 8/1987 | Plueddemann | 528/33 |
| 4,737,562 | 4/1988 | Chaudhury et al. | 528/15 |
| 4,910,097 | 3/1990 | Nomura et al. | 428/623 |
| 5,068,134 | 11/1991 | Cole et al. | 427/376.2 |
| 5,165,992 | 11/1992 | Yajima | 428/328 |

FOREIGN PATENT DOCUMENTS

| | | |
|---|---|---|
| 0304958 | 3/1989 | European Pat. Off. |
| 0356075 | 2/1990 | European Pat. Off. |
| 0409272 | 1/1991 | European Pat. Off. |
| 0492828 | 7/1992 | European Pat. Off. |
| 116381 | 7/1984 | Japan |
| 208480 | 10/1985 | Japan |
| 584 | 1/1986 | Japan |
| 79992 | 4/1988 | Japan |
| 219587 | 9/1988 | Japan |
| 146676 | 6/1991 | Japan |

*Primary Examiner*—Shrive Beck
*Assistant Examiner*—Erma Cameron
*Attorney, Agent, or Firm*—R. J. Bunyard; L. A. Fillnow; R. H. Johnson

[57] ABSTRACT

A metallic coated steel such as a galvanized sheet is coated with a thin siloxane film having a preferred thickness of about 45 Å for providing temporary corrosion protection. The siloxane film is formed by rinsing the metallic coated sheet with an aqueous solution containing 0.5-2.0 vol. % silane and 0.1-1.0 vol. % crosslinking agent. The silane coating deposited on the rinsed sheet is cured at a temperature less than 200° C. Preferred silane and crosslinking agents are γ-aminopropyltriethoxy and $(CH_3O)_3SiCH_2CH_2Si(OCH_3)_3$ respectively. The siloxane film may be removed by rinsing the metallic coated steel sheet in an alkaline solution prior to coating the sheet with a phosphate conversion coating and a paint.

14 Claims, 1 Drawing Sheet

METALLIC COATED STEEL HAVING A SILOXANE FILM PROVIDING TEMPORARY CORROSION PROTECTION AND METHOD THEREFOR

BACKGROUND OF THE INVENTION

This invention relates to providing temporary corrosion protection of metallic coated steel using an organic coating. More particularly, the invention relates to metallic coated steel sheet coated with a thin film of siloxane for suppressing white rust.

Metallic coated steel sheet, particularly hot dipped galvanized steel sheet, has long been plagued with the problem of white rusting during storage while awaiting further processing or during shipment to a customer. This white rust is caused by moisture condensation on the surface of the metallic coating.

There have been numerous proposals to suppress white rust caused by moisture condensation on galvanized steels. Several artisans have proposed rinsing galvanized steel in a bath containing up to about 10 wt. % of a silane coupling agent prior to painting. Silanes proposed include aminopropyl trimethoxy, aminopropyl triethoxy, methacryloxy propyl trimethoxy and glycidoxypropyl trimethoxy. The rinsed steel may be baked at an elevated temperature to form a hardened or permanent thick silane coating. Although the thick silane coating provides good corrosion protection, the coating may be difficult to remove prior to subsequent processing.

It also is known to rinse galvanized steels with a chromate solution containing a silane coupling agent to suppress white rust. Although the chromate coating provides good corrosion protection, the coating is formed using environmentally toxic solutions that can not be disposed of economically.

It also is known to use a composite coating to protect galvanized steel from white rust by sequentially rinsing the steel with a chromate solution and a silicate solution. These toxic solutions also can not be disposed of economically and the composite coating generally can not be removed.

It recently has been proposed to protect galvanized steel from white rust using a silica compound. Immediately after hot dipping while still at galvanizing temperatures, a freshly coated steel is rinsed with a solution containing an organic or inorganic alkyl silicate.

As evidenced by the effort of previous workers, there has been a long felt need to develop a low cost, corrosion resistant coating for metallic coated steel that is formed using environmentally safe coating solutions that can be disposed of economically. There especially is a need for a nontoxic, corrosion resistant coating that suppresses white rust and does not impair phosphatability of hot dipped galvanized steels to be painted. Ideally, the corrosion resistant coating should be removable from the steel prior to subsequent processing so that the steel substrate is free of corrosion products, dirt, oil and the like to enhance bonding of paint to the steel substrate.

BRIEF SUMMARY OF THE INVENTION

The invention includes a metallic coated steel sheet having a thin siloxane film for providing temporary corrosion protection. This siloxane film is the cured reaction product formed by rinsing the metallic coated steel sheet with an organic silane and a crosslinking agent.

Another feature of the invention includes the aforesaid siloxane film having a thickness 10–100 Å.

Another feature of the invention includes the aforesaid metallic coating being hot dipped zinc or zinc alloy.

The invention also includes a method of forming a metallic coated steel sheet having a thin siloxane film for providing temporary corrosion protection. The siloxane film is formed by rinsing the metallic coated steel sheet with an organic silane and a crosslinking agent. The silane coating deposited on the rinsed sheet is cured at a temperature no greater than 200° C.

Another feature of the invention includes the aforesaid silane coating being formed from a solution containing 0.5–2.0 vol. % of the silane and 0.1–1.0 vol. % of the crosslinking agent.

Another feature of the invention includes the aforesaid crosslinking agent, when hydrolyzed, to contain two or more $Si(OH)_3$ groups.

Another feature of the invention includes the aforesaid silane being from the group consisting of amino silanes.

A principal object of the invention is to form a nontoxic, removable coating that is impervious to moisture to provide short term corrosion resistance for a metallic coated steel.

Another object is to form a removable coating that suppresses white rust and does not impair phosphatability of galvanized steels to be painted.

Additional objects include forming a removable coating on a metallic coated steel without using solutions or creating waste materials either of which coated steel without using solutions or creating waste materials either of which contain toxic substances and forming the coating on the steel using a high speed processing line.

Advantages of the invention include an inexpensive, corrosion resistant coating for suppressing white rust on a variety of metallic coated steel surfaces, a coating that can readily be removed, no environmentally hazardous waste substances to dispose of and a clean metal substrate for steels to be painted.

DETAILED DESCRIPTION OF THE PREFERRED EMBODIMENTS

Figure 1:
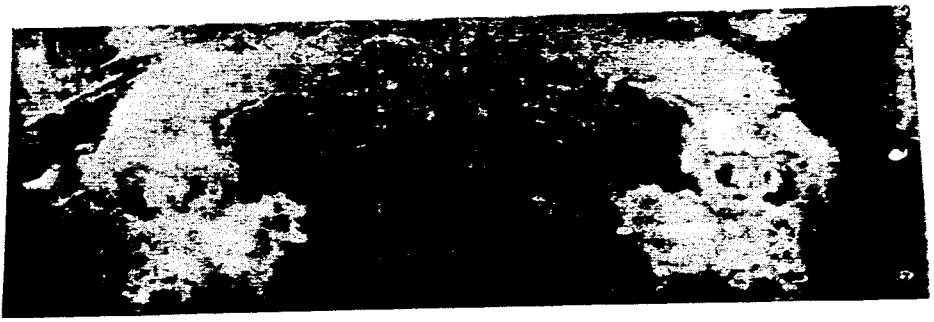
FIG. 1 is a photograph illustrating a galvanized steel not protected against corrosion with a siloxane film of the invention that became completely covered with white rust when exposed to humidity.

An important aspect of the invention is being able to quickly and economically form a nontoxic, removable coating that is impervious to moisture thereby providing short term corrosion resistance on a metallic coated steel sheet. We have determined a siloxane film formed by rinsing the metallic coated steel sheet with a silane and a crosslinking agent provides excellent temporary corrosion resistance. The siloxane film is formed when the silane coating deposited on the rinsed sheet is cured using the crosslinking agent. The siloxane film can be used for temporary corrosion protection in industrial applications on a variety of metallic coated steel substrates wherein the coating metal otherwise would be susceptible to corrosion such as white rust.

The siloxane film of the invention can be formed on hot dipped or electroplated metallic coated steel sheets. The metallic coating may include but is not limited to one or more layers of zinc, zinc alloy, aluminum and aluminum alloy for coating low carbon and stainless steels. By sheet is meant to include continuous strip or foil and cut lengths. The invention has particular utility for hot dipped galvanized steel sheets that are to be painted with a powder or a liquid. These painted steels may include a phosphate conversion coating applied to the steel substrate after the siloxane film is removed prior to painting. The siloxane film provides corrosion protection for the metallic coating while the steel is held in storage or being shipped to a customer.

An essential feature of the invention is for a metallic coated steel sheet be coated with a silane including a crosslinking agent. Although the silane coating can be formed by sequentially rinsing the steel sheet with a first solution containing a silane and a second solution containing a crosslinking agent, preferably the steel sheet is rinsed with a single solution containing both the silane and the crosslinking agent. Not being bound by theory, the crosslinking agent is believed to be necessary because the siloxane film formed is denser than an uncured silane coating otherwise would be if a crosslinking agent is not used. A denser coating is believed to be desirable because the reaction rate with moisture is reduced. That is, the cured silane coating has a hydrolytically stable —Si—O—Si— structure that is impervious to water. The crosslinking agent also is believed to be desirable because the siloxane film is thin, i.e., no greater than about 100 Å, thereby allowing it to be more readily dissolved and removed when the protective film no longer is necessary. Any crosslinking agent can be used to form the siloxane film of the invention if the crosslinking agent, which when hydrolyzed, contains two or more $Si(OH)_3$ groups. The $Si(OH)_3$ groups may be formed from a silicon ester upon hydrolysis, i.e., $Si(OX)_3$ where X is ethyl, methyl or acetoxy. Alternatively, the $Si(OH)_3$ groups may be formed from a silicon halide upon hydrolysis, i.e., $SiY_3$ where Y is a chloride. A preferred crosslinking agent is $(CH_3O)_3SiCH_2CH_2Si(OCH_3)_3$. Other possible crosslinking agents include $(CH_3O)_3SiCH_2CH_2CH_2Si(OCH_3)_3$, $(CH_3O)_3Si(CH_2)_6Si(OCH_3)_3$, $Si(OC_2H_5)_4$, $(CH_3O)_3SiCH_2CH_2Si(CH_3)_2$—O—$Si(CH_3)_2CH_2CH_2Si(OCH_3)_3$,

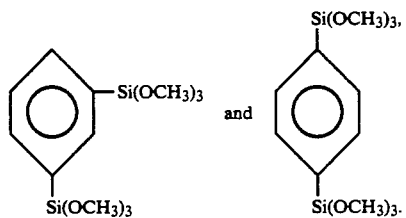

Silanes found to perform very well in the invention were amino silanes with γ-aminopropyl trialkoxy (APS) being the most preferred. Examples of other silanes that can be used as well include γ-glycidoxypropyltrimethoxy (GPS), γ-methacryloxypropyltrimethoxy, mercaptopropyltriacetoxy, diaminosilanes (AEAPS), vinylpropyltrimethoxy or N-[2-(vinylbenzylamino)ethyl]-3-aminopropyltrimethoxy (SAAPS) silane.

To be used as a rinse for forming an impervious thin film of siloxane, a crosslinking agent and a silane are hydrolyzed separately in an acidic aqueous solution. After being hydrolyzed, the two solutions containing the crosslinking agent and the silane are mixed together. The concentration of the crosslinking agent in the mixed solution preferably should be about 0.1–1.0 vol. % with at least 0.2 vol. % being more preferred. The concentration should be at least 0.1 vol.-% to insure the metallic coated steel substrate is covered with a dense film that is impervious to moisture. A concentration above 1.0 vol.-% is undesirable because the siloxane film becomes too brittle and would be difficult to remove.

The silane concentration preferably should be about 0.5–2.0 vol.-% with at least 0.8 vol. % being more preferred. The concentration should be at least about 0.5 vol.-% to insure the steel substrate is completely covered with the dense siloxane film without any uncoated areas. A silane concentration above 2.0 vol.-% is undesirable because the siloxane film becomes too thick thereby becoming difficult to remove.

The siloxane film should be thin preferably having an average thickness in the range of about 10–100 Å, with at least 45 Å being more preferred. An average siloxane thickness of at least about 10 Å is desired to ensure there are no uncoated areas on the surface of the metallic coated steel sheet. A siloxane thickness above 100 Å is undesirable because the siloxane is not easily dissolved when it becomes necessary to remove the siloxane prior to subsequent processing of the steel.

We determined a corrosion resistant siloxane film having a thickness of at least about 10 Å can be formed by rinsing a metallic coated steel sheet in a solution containing the crosslinking agent and the silane in as little as 5 seconds when the aqueous solution is at ambient temperature. For a metallic coated steel sheet to be painted, the siloxane film may be removed during a conventional phosphate conversion process.

Another important feature of the invention is the temperature required for curing the silane coating deposited when rinsing a metallic coated steel sheet. The silane coating preferably is cured at an elevated temperature but must not exceed the silane decomposition temperature, usually about 200° C. When the silane coating is cured below the decomposition temperature, the siloxane film may subsequently be removed when additional processing, e.g., painting, of the metallic coated steel sheet is required. If the silane coated sheet is cured at the decomposition temperature, the organic coating decomposes into silicon dioxide and/or silicon carbide which inhibit formation of a phosphate coating prior to painting. For steel sheet that is metallic coated on a continuous hot dip galvanizing line, the freshly galvanized steel advantageously may be rinsed with the solution containing the silane and crosslinking agent shortly after the steel exits the molten zinc bath. For example, the hot galvanized steel may be immersed into the rinse solution containing the silane and crosslinking agent as soon as the steel is cooled to near the decomposition temperature of the silane, i.e., about 200° C. The residual heat of the steel exiting the rinse solution may be sufficient to cure the silane deposited coating.

EXAMPLE 1

Low carbon steel test panels hot dip coated with 90 $g/m^2$ of zinc on each side were used as a control sample. These galvanized panels which were not coated with a silane were tested for corrosion in a humidity chamber maintained at 38° C. The test panels were spaced at 5 cm intervals on a rack, e.g., rack test. After being in the humidity chamber for 16 hours, these test panels had greater than 50% white rust.

EXAMPLE 2

Additional ones of the test panels of Example 1 were clamped together without any interval between one another, e.g., stack test, and also were evaluated as a control sample. After being in the humidity chamber for 65 hours, these test panels also had greater than 50% white rust.

EXAMPLE 3

The test panels of Example 1 were again evaluated for corrosion except the panels now were coated with a silane coating. 1.0 vol. % APS silane was hydrolyzed in a liter of water having a pH of 4 at ambient temperature for about 4 minutes. A crosslinking agent was not used. After being immersed in the silane solution for 5 seconds, the panels then were dried in air. Water was completely removed from the silane coating and a dry silane film having a thickness of about 50 Å was formed on each side of the panels. The panels then were tested for corrosion in the humidity chamber maintained at 38° C. using the rack test. After being in the humidity chamber for 16 hours, 0.25% white rust was observed on the panels.

EXAMPLE 4

In another test, the APS coated panels of Example 3 were evaluated for corrosion except the stack test was used. After being in the humidity chamber for 65 hours, 2.5% white rust was observed on the panels.

EXAMPLES 5-6

In another test, the APS coated panels were evaluated for corrosion using the rack test as described in Example 3 except the panels were heated to a temperature of 225° C. The hot panels then were immersed into the silane solution of Example 3. After being in the humidity chamber for 168 hours using the rack test, 1% white rust was observed on the panels. After being in the humidity chamber for 120 hours using the stack test, 2% white rust was observed on the panels.

EXAMPLE 7

Test panels coated with a siloxane film of the invention now will be described. After preparing the APS silane containing solution described in Example 3, a second solution containing a crosslinking agent was prepared. 0.2 vol. % of $(CH_3O)_3SiCH_2CH_2Si(OCH_3)_3$ crosslinking agent was hydrolyzed in a liter of water having a pH of 4 and ambient temperature for about 30 minutes. The two solutions then were combined. The galvanized test panels described in Example 1 were immersed into the mixed solution containing the silane and crosslinking agent for 5 seconds. The test panels were dried in air forming a dense siloxane film having a thickness of 45 Å on each side of the panels. The test panels then were placed in the humidity chamber using the stack test. After about 65 hours, 2.5% white rust was observed on the test panels.

EXAMPLES 8-9

In another test, galvanized panels were coated with the siloxane film of the invention as described in Example 7 except the silane coated panels were heated to a temperature of 110° C. and maintained at this temperature for about 10 minutes to form the siloxane film having a thickness of about 45 Å on each side of the panels. The panels were evaluated for corrosion using rack and stack tests. After being in the humidity chamber for 16 hours using the rack test, less than 0.25% white rust was observed on the panels. After being in the humidity chamber for 65 hours using the stack test, 0.25% white rust was observed on the panels.

EXAMPLES 10-11

In another test, galvanized panels were coated with the siloxane film of the invention as described in Examples 8 and 9 except the silane used was AEAPS and the siloxane film was formed by drying the silane coated panels in air at ambient temperature. After being in the humidity chamber for 16 hours using the rack test, 0.5% white rust was observed on the panels. After being in the humidity chamber for 65 hours using the stack test, 5% white rust was observed on the panels.

EXAMPLE 12

In another test, galvanized panels were coated with a silane coating as described in Example 3 except the silane used was SAAPS. After being in the humidity chamber for 168 hours using the rack test, 30% white rust was observed on the panels.

EXAMPLE 13

In another test, galvanized panels were coated with the siloxane film of the invention as described in Examples 8 and 9 except the silane used was SAAPS. After being in the humidity chamber for 168 hours using the rack test, 5% white rust was observed on the panels.

EXAMPLE 14-15

In another test, galvanized panels were evaluated for corrosion as described in Examples 12 and 13 except the silane used was GPS. After being in the humidity chamber for 168 hours using the rack test, the panels coated with the silane coating were observed to have 5% white rust. After being in the humidity chamber for 168 hours using the rack test, the panels coated with the siloxane film of the invention were observed to have 1% white rust.

EXAMPLE 16-17

In another test, galvanized panels were evaluated for corrosion as described in Examples 14 and 15 except the silane used was APS. After being in the humidity chamber for 168 hours using the rack test, the panels coated with the silane coating were observed to have 1% white rust. After being in the humidity chamber for 168 hours using the rack test, the panels coated with the siloxane film of the invention were observed to have less than 1% white rust.

EXAMPLE 18-19

In another test, galvanized panels were evaluated for corrosion as described in Examples 16 and 17. After being in the humidity chamber for 120 hours using the stack test, the panels coated with the siloxane film of the invention were observed to have 1% white rust.

EXAMPLE 20-21

In another test, galvanized panels were evaluated for corrosion as described in Examples 12 and 13. After being in the humidity chamber for 120 hours using the stack test, the panels coated with the silane coating were observed to have 30% white rust. After being in the humidity chamber for 120 hours using the stack test, the panels coated with the siloxane film of the invention were observed to have 5% white rust.

Results of the above tests are summarized in the table below.

| Example | Silane | XL Agent** | XL Temp. (°C.) | Test | Time (hrs.) | % White Rust* |
|---|---|---|---|---|---|---|
| 1 | — | — | — | rack | 16 | >50 |
| 2 | — | — | — | stack | 65 | >50 |
| 3 | APS | — | — | rack | 16 | 0.25 |
| 4 | APS | — | — | stack | 65 | 2.5 |
| 5*** | APS | — | — | rack | 168 | 1 |
| 6*** | APS | — | — | stack | 120 | 2 |
| 7 | APS | yes | — | stack | 65 | 2.5 |
| 8 | APS | yes | 110 | rack | 16 | <0.25 |
| 9 | APS | yes | 110 | stack | 65 | 0.25 |
| 10 | AEAPS | yes | — | rack | 16 | 0.5 |
| 11 | AEAPS | yes | — | stack | 65 | 5 |
| 12 | SAAPS | — | — | rack | 168 | 30 |
| 13 | SAAPS | yes | 110 | rack | 168 | 5 |
| 14 | GPS | — | — | rack | 168 | 5 |
| 15 | GPS | yes | 110 | rack | 168 | 1 |
| 16 | APS | — | — | rack | 168 | 1 |
| 17 | APS | yes | 110 | rack | 168 | <1 |
| 18 | APS | — | — | stack | 120 | 5 |
| 19 | APS | yes | 110 | stack | 120 | 1 |
| 20 | SAAPS | — | — | stack | 120 | 30 |
| 21 | SAAPS | yes | 110 | stack | 120 | 5 |

*The rating of ASTM B537 was adapted for white rust evaluation.
**The crosslinking agent was $(CH_3O)_3SiCH_2CH_2Si(OCH_3)_3$.
***Galvanized panels were heated to 225° C. prior to being immersed into the APS silane solution.

The galvanized steels in Examples 3–6, 12, 14, 16, 18 and 20 coated with an uncrosslinked silane all had less white rust than the galvanized steel in the control samples of Examples 1 and 2 having no coating for protecting the zinc from white rust. Nevertheless, galvanized steels coated with the uncrosslinked silane generally experienced considerable white rusting when exposed to high humidity for extended periods of time, i.e., at least 120 hours, in a humidity chamber as demonstrated by the results in Examples 5, 6, 12, 14, 16, 18 and 20. Except for Examples 5, 6 and 16, galvanized steel coated with an uncrosslinked silane had 5% or more white rust. Surprisingly, however, we discovered that galvanized steel coated with a crosslinked silane of the invention, i.e., a thin siloxane film, dramatically improved the resistance to white rust when the steel was exposed to high humidity for extended periods of time when compared to galvanized steel coated with an uncrosslinked silane. For example, the results for Examples 13, 15, 17, 19 and 21 wherein galvanized steel was coated with a siloxane film had the incidence of white rust greatly suppressed as compared to corresponding Examples 12, 14, 16, 18 and 20 wherein the galvanized steel was coated with an uncrosslinked silane. A siloxane film formed using APS and GPS silanes suppressed the incidence of white rust to 1% or less when the galvanized steel was exposed to high humidity for an extended period of time.

The results of Examples 13, 15, 17, 19 and 21 demonstrate the preferred silane for forming the siloxane film of the invention is APS. When the siloxane treated samples were exposed to the rack test for 168 hours, the percentage of white rust was 5, 1 and less than 1 for SAAPS, GPS and APS silanes respectively. When the siloxane treated samples were exposed to the stack test for 120 hours, the percentage of white rust was 1 and 5 for APS and SAAPS silanes respectively.

The siloxane coated test panels in Example 9 were immersed into a alkaline cleaning solution during a conventional phosphating operation. After being in the alkaline solution for 2 minutes, the siloxane film was completely dissolved and removed by the alkaline solution. Phosphatability and formability of the galvanized steel was not adversely affected after the siloxane film was removed.

Figure 2:
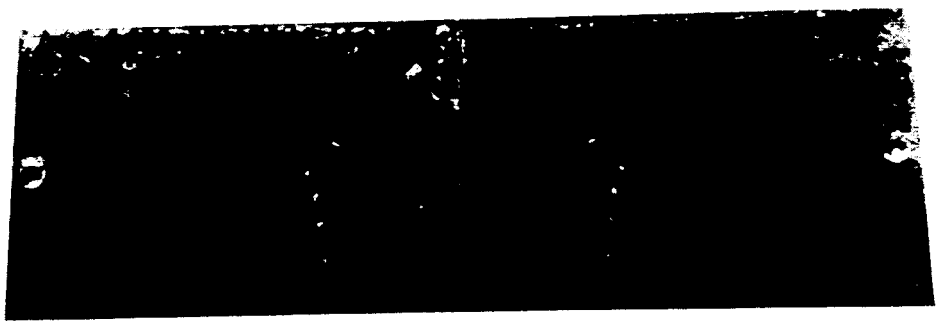
FIG. 2 is another photograph illustrating the same galvanized steel protected against corrosion with a siloxane film of the invention was relatively free of white rust when exposed to humidity.

FIG. 1 illustrates the incidence of white rust on the galvanized control sample of Example 2 after being in the humidity chamber for 65 hours when using the stack test. FIG. 2 illustrates the incidence of white rust on the galvanized sample of Example 9 after being in the humidity chamber for 65 hours when using the stack test was nearly eliminated when the steel was protected with a siloxane film of the invention.

It will be understood various modifications can be made to the invention without departing from the spirit and scope of it. Therefore, the limits of the invention should be determined from the appended claims.

What is claimed:

1. A method of providing temporary corrosion protection for steel by applying a siloxane film which is removable by alkaline rinse, comprising the steps of:
   providing a steel sheet coated with a metal from the group consisting of zinc, zinc alloy, aluminum and aluminum alloy,
   rinsing the sheet with a solution containing a silane and 0.1–1.0 vol. % of a crosslinking agent, and
   curing the silane coating at a temperature less than 200° C. thereby forming the siloxane film.

2. The method of claim 1 wherein the siloxane film has a thickness of 10–100 Å.

3. The method of claim 2 wherein the siloxane film has a thickness of about 45 Å.

4. The method of claim 1 wherein the sheet is rinsed with an aqueous solution containing the silane and the crosslinking agent.

5. The method of claim 4 wherein the solution contains 0.5–2.0 vol. % of the silane.

6. The method of claim 1 wherein the rinsing time is ≧5 seconds.

7. The method of claim 1 wherein the crosslinking agent contains two or more $Si(OH)_3$ groups after being hydrolyzed.

8. The method of claim 7 wherein the crosslinking agent is $(CH_3O)_3SiCH_2CH_2Si(OCH_3)_3$.

9. The method of claim 1 wherein the silane is from the group consisting of amino silanes.

10. The method of claim 9 wherein the silane is γ-aminopropyl trialkoxy.

11. A method of providing temporary white rust protection for steel, comprising the steps of:
   providing a galvanized steel sheet,
   rinsing the sheet in an aqueous solution containing 0.5–2.0 vol. % silane and 0.1–1.0 vol. % crosslinking agent, and
   curing the silane coating at a temperature <200° C. thereby forming a siloxane film having a thickness of 10–100 Å.

12. A method of providing temporary corrosion protection for steel, comprising the sequential steps of:
   providing a metallic coated steel sheet,
   rinsing the sheet with a silane and a crosslinking agent, curing the silane coating at a temperature less than the decomposition temperature of the silane thereby forming a siloxane film, removing the siloxane film by rinsing the sheet with an alkaline solution, coating the sheet with a phosphate conversion coating, and painting the phosphated sheet.

13. A method of providing temporary corrosion protection for steel, comprising the steps of:

providing a metallic coated steel sheet, rinsing the sheet with a silane and a crosslinking agent, curing the silane coating at a temperature less than the decomposition temperature of the silane thereby forming a siloxane film, and removing the siloxane film by rinsing the sheet with an alkaline solution.

14. A method of providing temporary corrosion protection for steel by applying a siloxane film which is removable by alkaline rinse, comprising the steps of:

providing a steel sheet, dipping the sheet into a molten bath of zinc or zinc alloy to form a galvanized sheet, cooling the galvanized sheet to less than about 200° C., rinsing the galvanized sheet with a solution containing a silane and 0.1-1.0 vol. % of a crosslinking agent whereby the silane coating is cured to the siloxane film.

* * * * *